United States Patent
Choi

(10) Patent No.: US 8,941,713 B2
(45) Date of Patent: Jan. 27, 2015

(54) VIDEO PHONE CALL METHOD HAVING FUNCTION OF ADJUSTING RESOLUTION QUALITY AND VIDEO PHONE CALL APPARATUS SUPPORTING THE SAME

(75) Inventor: Woo Young Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 13/325,266

(22) Filed: Dec. 14, 2011

(65) Prior Publication Data

US 2012/0162348 A1 Jun. 28, 2012

(30) Foreign Application Priority Data

Dec. 24, 2010 (KR) ........................ 10-2010-0134145

(51) Int. Cl.
*H04N 7/14* (2006.01)
*H04W 4/18* (2009.01)
*H04L 1/00* (2006.01)
*H04L 29/06* (2006.01)
*H04N 21/235* (2011.01)
*H04N 21/238* (2011.01)
*H04N 21/262* (2011.01)
*H04N 21/4223* (2011.01)
*H04N 21/435* (2011.01)
*H04N 21/4788* (2011.01)

(52) U.S. Cl.
CPC ................. *H04N 7/147* (2013.01); *H04W 4/18* (2013.01); *H04L 1/0014* (2013.01); *H04L 65/80* (2013.01); *H04N 21/235* (2013.01); *H04N 21/238* (2013.01); *H04N 21/26216* (2013.01); *H04N 21/4223* (2013.01); *H04N 21/435* (2013.01); *H04N 21/4788* (2013.01); *H04L 65/1009* (2013.01)

USPC .................... 348/14.12; 348/14.01; 370/271

(58) Field of Classification Search
USPC .................... 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 6,014,694 A | * | 1/2000 | Aharoni et al. | 709/219 |
| 7,446,795 B2 | * | 11/2008 | Rengaraju et al. | 348/14.01 |
| 8,189,553 B2 | * | 5/2012 | Pattavina et al. | 370/345 |
| 2003/0002577 A1 | * | 1/2003 | Pinder | 375/240.01 |
| 2005/0122960 A1 | * | 6/2005 | Khan | 370/352 |
| 2006/0056416 A1 | * | 3/2006 | Yang et al. | 370/395.2 |
| 2007/0201435 A1 | * | 8/2007 | Fisher | 370/352 |
| 2007/0237180 A1 | * | 10/2007 | Park et al. | 370/474 |
| 2008/0049659 A1 | * | 2/2008 | Ram et al. | 370/316 |
| 2008/0117919 A1 | * | 5/2008 | Kliger et al. | 370/400 |
| 2008/0205314 A1 | * | 8/2008 | Pecen | 370/310 |
| 2009/0213940 A1 | * | 8/2009 | Steinbach et al. | 375/240.27 |
| 2009/0259460 A1 | * | 10/2009 | Jia et al. | 704/215 |

* cited by examiner

*Primary Examiner* — Hemant Patel
(74) *Attorney, Agent, or Firm* — Jefferson IP Law, LLP

(57) ABSTRACT

A video phone call method for adjusting resolution quality and a video phone call apparatus supporting the same are provided. The video phone call apparatus includes a Radio Frequency (RF) communication unit for transmit a video phone call connection request message and for receiving a video phone call connection accept message in response to the video phone call connection request message to form a communication channel for connection of video phone call, a camera for collecting an image signal for the video phone call, an audio processor for collecting an audio signal for the video phone call, and a controller for creating a control signal for controlling the image signal and the audio signal, and for adding a collected video frame to the video phone call data to generate integral video phone call data having additional video frame data.

15 Claims, 9 Drawing Sheets

FIG. 7
(RELATED ART)

| MUX PDUs | Tx |
|---|---|
| Total Packets | 44,705 |
| Stuffing Packets | 37,562 |
| Packets Processed | 7,143 |
| Maximum Size (bytes) | 162 |
| Average Size (bytes) | 84 |
| Minimum Size (bytes) | 9 |
| Total Bytes (bytes) | 602,439 |
| Stuffing Flags (bytes) | 187,810 |
| Stuffing Flags (%) | 23.77 |

FIG. 9

| MUX PDUs | Rx |
|---|---|
| Total Packets | 12,894 |
| Stuffing Packets | 8,124 |
| Packets Processed | 4,770 |
| Maximum Size (bytes) | 200 |
| Average Size (bytes) | 154 |
| Minimum Size (bytes) | 9 |
| Total Bytes (bytes) | 733,380 |
| Stuffing Flags (bytes) | 40,620 |
| Stuffing Flags (%) | 5.25 |

VIDEO PHONE CALL METHOD HAVING FUNCTION OF ADJUSTING RESOLUTION QUALITY AND VIDEO PHONE CALL APPARATUS SUPPORTING THE SAME

PRIORITY

This application claims the benefit under 35 U.S.C. §119(a) of a Korean patent application filed on Dec. 24, 2010 in the Korean Intellectual Property Office and assigned Serial No. 10-2010-0134145, the entire disclosure of which is hereby incorporated by reference.

BACKGROUND OF THE INVENTION

1. Field of the Invention

The present invention relates to a video phone call. More particularly, the present invention relates to a video phone call method having a function of adjusting resolution quality capable of transmitting improved images according to an image call service environment and a video phone call apparatus supporting the same.

2. Description of the Related Art

Mobile communication terminals have various functions in addition to voice communication and Short Message Service (SMS), such as a video phone call function, an electronic organizer function, and an Internet function. Recent mobile communication terminals also include a digital camera function. The digital camera function enables the mobile communication terminal to photograph and store moving or still images, and provides an image transmission function to users based thereon.

A video phone call in a current $3^{rd}$ Generation (3G) network is served through an international standard known as 3G-324M. A maximum capacity of video, audio, and data described in the standard changes according to capacity of a data transmitter. However, in general, the capacity of a Circuit Switched Data (CSD) network for a video phone call in a 3G network is 64 kbps. As 64 kpbs is a CSD circuit maximum communication bandwidth of 3G networks, a video phone call of the related art adjusts and uses a bit-rate of video and audio within 64kbps. Typically, the video, the audio, and the data are operated with maximum rates of maximum 48~50 kbps, 4~12 kbps, and 2 kbps, respectively.

A video phone call service using 3G-324M protocol secures mutual compatibility between mobile communication businesses. International standards have been developed for a simple and exact service between users, which is currently used and served by most 3G businesses. This is designed based on data transmission between terminals. A 3G-324M video phone call protocol is a call scheme through protocol exchange between terminals in an END-TO-END scheme, and the process of exchanging information with respect thereto is performed by various protocol signaling procedures to be initially achieved for connection.

A video phone call protocol signaling procedure includes mobile level detection for determining data integrity test and error correction step of a video phone call, Master Slave Determination (MSD) for determining a priority between a subject of a mutual operation and a terminal, Terminal Capability profile Set (TCS) (which is a performance information exchange stage of image and voice codec), Multiple table Entry Set (MES) for determining the size of transmission data and packet information, and an Open Logical channel (OLCl) stage for setting and opening a logic channel of a final image and voice. Each stage transmits/receives protocol data through a repeated and complicated process of request and acknowledgement between terminals of transmission/reception sides. The electric field strength of a 3G network greatly affects the foregoing procedure. Transmission/reception rates of data change according to an electric field of a 3G network and greatly affect a connection success rate of a real image call and call quality.

Accordingly, an image call service of the related art is restricted on maximum transmission/reception capacity according to a data transmission protocol between terminals, and may inevitably have restriction on an operation of a 3G network of a mobile communication business. Due to this weak point, a final video phone call user inevitably receives low quality images and audio. For this reason, quality estimation of a 3G video phone call service is low. Because a fixed bandwidth of about 48 kbps allotted to image transmission of a video phone call cannot provide sufficient resolution quality, and cannot reflect a state and characteristics of a moving network of real data, quality of a video phone call frequently deteriorates. Each media channel uses a fixed bandwidth in a video phone call of the related art based on a 3G network uses a fixed bandwidth, and thus extension of the bandwidth to change a bit rate of corresponding media is impossible. Similarly, because use of the fixed bandwidth is not efficient, improving image and audio quality is difficult. Moreover, because a protocol and a media channel are operated in a video phone call service of the related art regardless of a network state, the quality of the video phone call cannot be improved in comparison with the performance of a 3G terminal.

SUMMARY OF THE INVENTION

Aspects of the present invention are to address at least the above-mentioned problems and/or disadvantages and to provide at least the advantages described below. Accordingly, an aspect of the present invention is to provide a video phone call method having a function of adjusting resolution quality capable of improving image quality using a stuffing data region during a video phone call, and a video phone call apparatus supporting the same.

Another aspect of the present invention is to provide a method for improving image quality during a video phone call by transmitting additional information and data instead of stuffing data in order to efficiently use a fixed bandwidth during the video phone call.

In accordance with an aspect of the present invention, a video phone call method having a function of adjusting resolution quality is provided. The method includes collecting an image signal, an audio signal, and a control signal for a video phone call, generating video phone call data including the collected image signal, audio signal, and control signal, adding a collected video frame to the video phone call data to generate integral video phone call data having an additional video frame when the video phone call data has a packet size less than a preset value according to a data transfer protocol, and transmitting the integral video phone call data to another terminal In accordance with another aspect of the present invention, a video phone call apparatus for adjusting resolution quality is provided. The apparatus includes a Radio Frequency (RF) communication unit for transmitting a video phone call connection request message and for receiving a video phone call connection accept message in response to the video phone call connection request message to form a communication channel for connection of video phone call, a camera for collecting an image signal for the video phone call, an audio processor for collecting an audio signal for the video phone call, and a controller for creating a control signal for controlling the image signal and the audio signal, for creating video phone call data including the image signal, the audio signal, and the control signal, and for adding a collected video frame to the video phone call data to generate integral video phone call data having an additional video frame when the video phone call data has a packet size less than a preset value according to a data transfer protocol.

In accordance with another aspect of the present invention, a terminal is provided. The terminal includes a communication unit for communicating video phone call data with another terminal, a camera for collecting an image signal for the video phone call, a microphone and audio processor for collecting an audio signal for the video phone call, a display unit for displaying information related to the video phone call, a speaker for reproducing an audio portion of the video phone call, and a controller for creating a control signal to control the image signal and the audio signal, for creating the video phone call data including the image signal, the audio signal, and the control signal, and for adding an additional video frame to the video phone call to generate integral video phone call data having the additional video frame when the video phone call data has a packet size less than a preset value according to a data transfer protocol.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 7 is a table illustrating a used rate of a data channel according to a video phone call method according to the related art;

FIG. 9 is a table illustrating a used rate of a data channel according to a video phone call method according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
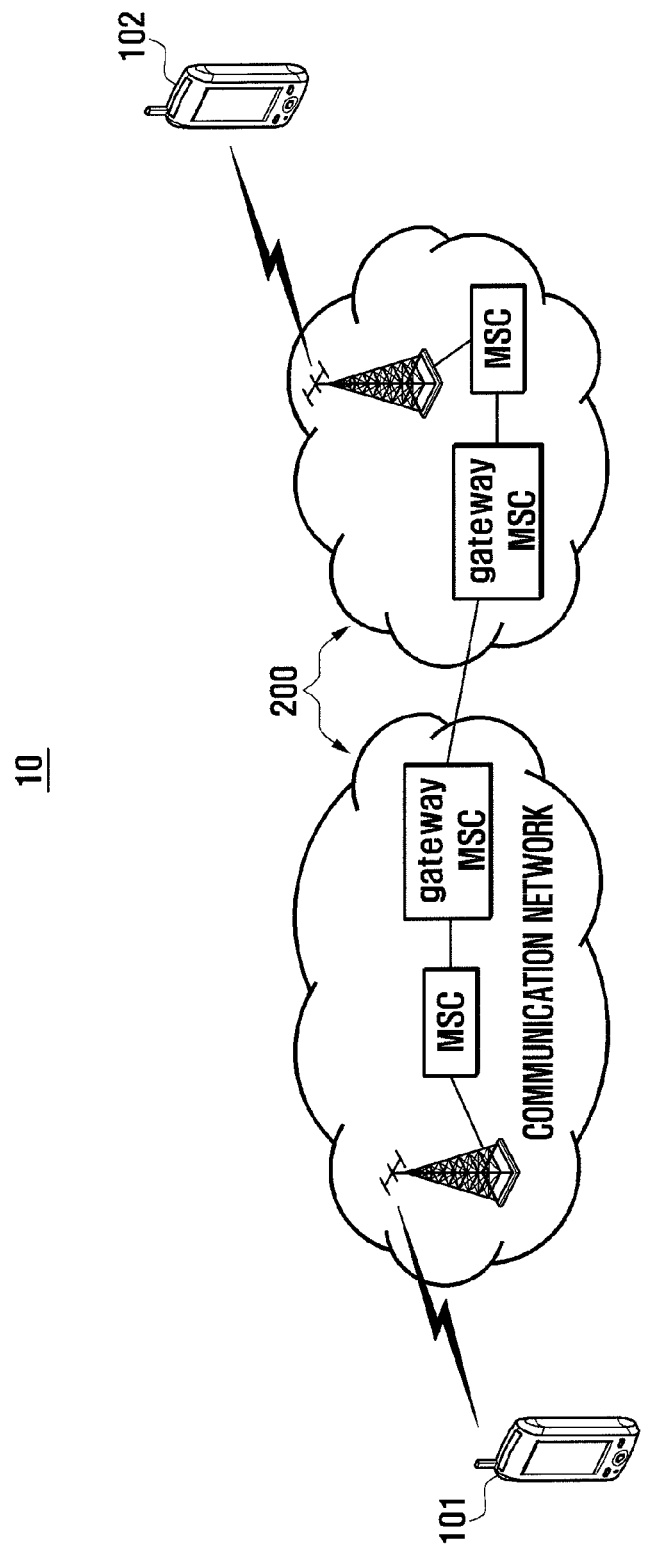
FIG. 1 is a block diagram schematically illustrating a configuration of a video phone call system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A video phone call apparatus performing a function according to an exemplary embodiment of the present invention is denoted herein as a mobile terminal. However, exemplary embodiments of the present invention are not limited to particular mobile terminals. A terminal according to an exemplary embodiment of the present invention may be any terminal having a module capable of performing a video phone call. Accordingly, the terminal may be a mobile terminal, a mobile phone, a wired/wireless phone, a Personal Digital Assistant (PDA), a smartphone, a Notebook or Personal Computer capable of using a video phone call service based on a $3^{rd}$ Generation (3G) network, a Wideband Code Division Multiple Access (WCDMA) terminal, a portable Internet terminal such as Wibro, an International Mobile Telecommunication 2000 (IMT-2000) terminal, a Global System For Mobile Communication/General Packet Radio Service (GSM/GPRS), Universal Mobile Telecommunication Service (UMTS), a multimedia device, and the like.

So as to illustrate transmission/reception procedures of a video phone call, a mobile terminal of a transmitting side is denoted herein as a first mobile terminal. Similarly, a mobile terminal of a receiving side is denoted herein as a second mobile terminal Accordingly, the first mobile terminal is a terminal performing a video phone call connection request, and the second mobile terminal is a terminal using a video phone call service through accepting the video phone call connection request. However, it would be understood that the first and second mobile terminals may be capable of acting as both a transmitter and a receiver.

FIG. 1 is a block diagram schematically illustrating a configuration of a video phone call system according to an exemplary embodiment of the present invention.

Referring to FIG. 1, the video phone call system 10 includes a first mobile terminal 101, a second mobile terminal 102, and a communication network 200, for example, a 3G communication network.

The 3G communication network 200 may be configured by a Node B functioning as a base station, a Radio Access Network (RAN) being a subsystem of the Node B, Mobile-Service Switching Center (MSC)/Visitor Location Register (VLR), and a Home Location Register (HLR) and Gateway MSC corresponding to a core network of a circuit switched domain. An MSC manages call control and mobility of a mobile terminal. A VLR and an HLR provide functions such as information registration and management of the mobile terminal as a subscriber information matching device. When a first mobile terminal 101 included in a 3G communication network attempts a call with a second mobile terminal 102 included in another 3G communication network, the 3G communication networks 200 may perform mutual connection using a gateway MSC.

The first mobile terminal 101 may belong to a 3G communication network 200 supported from a specific business to perform a camping procedure, and operate a communication service based on the 3G communication network 200 if necessary. The first mobile terminal 101 may transmit a video phone call connection request message to the second mobile terminal 102 belonging to the same mobile communication network or a mobile communication network of another business based on the 3G communication network 200. The 3G communication network 200 may obtain base information to which the second mobile terminal 102 belongs in order to transmit a video phone call connection request message provided from the first mobile terminal 101 to the second mobile terminal 102.

The first mobile terminal 101 and the second mobile terminal 102 transmit and receive a signaling message according to a data transfer protocol of the 3G communication network 200 to negotiate a protocol used for a video phone call and perform the video phone call according to the negotiated protocol. The first mobile terminal 101 determines an electric field state of a network in transmission/reception procedure of the signaling message, and prepares an additional video frame according to an electric field state of a corresponding network. The first mobile terminal 101 adds the additional video frame and the electric field state information of a network to video phone call data created during a video phone call, and transmits the video phone call data.

The second mobile terminal 102 may belong to a 3G communication network 200 supported from a certain business to perform a camping procedure in the same manner as in the first mobile terminal 101, and operate a communication service based on the 3G communication network 200 if necessary. The second mobile terminal 202 receives the video phone call connection request message provided from the first mobile terminal 101, and transmits a video phone call connection accept message accepting corresponding video phone call connection to the first mobile terminal 101 through the 3G communication network 200 according to the control of the user. The second mobile terminal 102 exchanges a signaling message with the first mobile terminal 101 according to a data transfer protocol of the 3G communication network 200 to negotiate a protocol used for a video phone call. The second mobile terminal 102 performs the video phone call according to the negotiated protocol. The second mobile terminal 102 may exchange an electric field state of a network and a signaling message with respect to presence of an additional video frame with the first mobile terminal 101 during the transmitting/receiving procedure of the signaling message so as to set a network operation for adjusting resolution quality according to an exemplary embodiment of the present invention.

As illustrated previously, the first mobile terminal 101 and the second mobile terminal 102 perform a video phone call through the 3G communication network 200 or 3G communication networks belonging to respective businesses by transmitting and receiving high quality images based on electric field information characteristics of a corresponding mobile communication network and an additional video frame. An example of the first mobile terminal 101 and the second mobile terminal 102 is described below with reference to FIG. 2.

Figure 2:
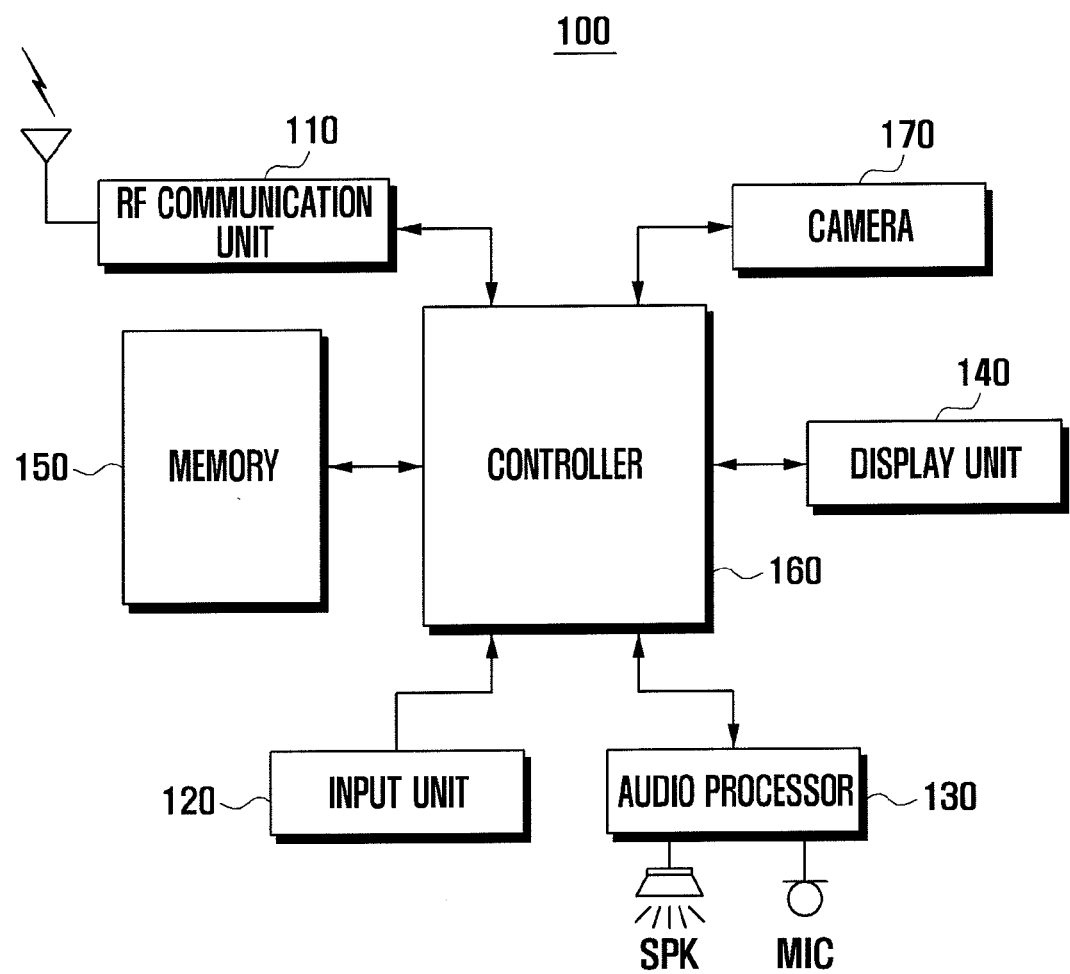
FIG. 2 is a block diagram schematically illustrating a configuration of a mobile terminal according to an exemplary embodiment of the present invention.

FIG. 2 is a block diagram schematically illustrating a configuration of a mobile terminal according to an exemplary embodiment of the present invention.

Referring to FIG. 2, a mobile terminal 100 may include a Radio Frequency (RF) communication unit 110, an input unit 120, an audio processor 130, a display unit 140, a camera 170, a controller 160, and a memory 150. As mentioned above, when the mobile terminal 100 acts as a transmitting side, the mobile terminal 100 may be understood as corresponding to the first mobile terminal 101. Similarly, when the mobile terminal 100 acts as a receiving side, the mobile terminal 100 may be understood as corresponding to the second mobile terminal 102.

If an input signal for a video phone call occurs based on the input unit 120 or a touch screen function as a terminal function of the first mobile terminal 101, the mobile terminal 100 may activate a camera 170 to collect images and perform a control operation to transmit a video phone call connection request message using the RF communication unit 110. When transmitting or receiving a signaling message used for video phone call connection, the mobile terminal 100 performs a control operation to exchange a signaling message for an operation of adjusting resolution quality with the second mobile terminal 102, thereby determining the presence of an additional video frame according to network electric field information and characteristics of an additional video frame in a next video phone call procedure. The mobile terminal 100 may write the network electric field information and the additional video frame into a stuffing data region and transmit the stuffing data region to operate an efficient network resource using a non-used channel region and to operate a video phone call service based on a high quality image.

The RF communication unit 110 transmits a video phone call connection request message to the second mobile terminal 102, or transmits/receives a signal message and video phone call data under the control of the controller 160. The RF communication unit 110 may include a transmitter for up-converting a frequency of a transmitted signal and amplifying the signal, and a receiver for low-noise-amplifying a received signal and down-converting the signal. When transmitting and receiving the signaling message, the RF communication unit 110 supports transmission/reception of a signaling message for transmission/reception set of integral video phone call data. The integral video phone call data denotes video phone call data containing an additional video frame and network signal strength information. Accordingly, when transmitting video phone call data according to a data transfer protocol supported from a communication network, the RF communication unit 110 may transmit integral video phone call data with an additional video frame according to a signal strength state of a communication network to the second mobile terminal 102.

When receiving a signaling message for transmission/reception set of the integral video phone call data provided from the first mobile terminal 101, the RF communication unit 110 of the second mobile terminal 102 may transmit a corresponding response message to the first mobile terminal 101. The RF communication unit 110 of the second mobile terminal 102 may transmit integral video phone call data containing network signal strength information and an additional video frame to an RF communication unit 110 of the first mobile terminal 101 during a video phone call in the same manner as in the first mobile terminal 101.

The input unit 120 includes a plurality of input keys and function keys for receiving input of numeral or character information and setting various types of functions. The function keys may include arrow keys, side keys, and hot keys set to perform certain functions. The input unit 120 creates and transfers a key input associated with user setting and function control of a mobile terminal 100 to the controller 160. In the first mobile terminal 101, the input unit 120 creates and transfers an input signal for creating a video phone call connection request message and a termination input signal for terminating a video phone call to the controller 160. In the second mobile terminal 102, the input unit 120 may create and transfer an input signal for creating and transferring a video phone call accept request message and a terminal input signal for terminating a video phone call to the controller 160.

The audio processor 130 includes a speaker SPK for playing audio data transmitted and received during a video phone call, and a microphone MIC for collecting a voice of the user or other audio signals during the video phone call. The audio signal collected by the audio processor 130 is integrated with image data collected by the camera 170, an additional video frame, and a control signal. The integrated signal may be transmitted to the second mobile terminal 102 as integral video phone call data using the RF communication unit 110. The audio signal collected by the audio processor 130 may become data of approximately 4~12 kbps according to presence of generation of the audio signal.

The display unit 140 may display the image collected by the camera 170 as a preview image and display integral video phone call data provided from another mobile terminal during a video phone call as an image. The display unit 170 may include a flat panel display device such as an Organic Light Emitting Diode (OLED) or a Liquid Crystal Display (LCD) is applicable to the display unit 140. When the LCD is used, the display unit 140 may include an LCD controller, a memory for storing data, and an LCD display element. The display unit 140 may include a touch screen structure including a touch panel. In this case, the display unit 140 may support a function as an input unit according to support of a touch screen function.

The display unit 140 may output an image collected by the camera 170 to a predetermined region during a video phone call. The display unit 140 may display the integral video phone call data provided from a mobile terminal of another user distinguished from a region collected and output from the camera 170. For example, the first mobile terminal 101 may perform a video phone call with the second mobile terminal 102. The display unit 140 of the first mobile terminal 101 may include a first screen that collects and outputs a corresponding preview image with the predetermined size by the camera 170 mounted in a terminal and a second screen displaying the integral video phone call data provided from the mobile terminal 102. The first screen and the second screen may be displayed to separate a screen on the same plane, and the second screen may be displayed to overlay the first screen.

The display unit 140 may display an additional video frame included in corresponding integral video phone call data provided from a mobile terminal of another user. The additional video frame may become an I frame or a P frame according to signal strength information of a network. Accordingly, the controller 160 performing a control operation to output integral video phone call data identifies a stuffing data region in which an additional video frame region is written in a procedure of decoding the integral video phone call data to extract a corresponding frame, and applies the extracted frame to image data to be output from the display unit 140 as part of a higher quality image.

The memory 150 stores a video phone call operation program used for a video phone call, an application program for camera operation, and user data, as well as an application program used for a function operation according to an exemplary embodiment of the present invention. The memory 150 may include a program area and a data area.

The program area stores an Operating System (OS) for booting the mobile terminal 100, a video phone call operation program supporting an operation of a camera 170 for video phone call, audio collection, and adaptive resolution quality adjustment based on collected information, and an application program used for other options function of the mobile terminal 100, for example, voice playback function, image or moving image playback function.

The video phone call application program includes a routine for operation of an H.324M module 60 included in the controller 160. The video phone call application program may support generation, transmission, reception, and decoding procedures of the integral video phone call data. The video phone call application program may include a routine for obtaining network electric field information, a routine for controlling a characteristic of an additional video frame collected by the camera 170 according to the network electric field information, and a routine for transferring the network signal strength information and the additional video frame to an H.223 module 67 of the H.324M module 60.

The data area stores data created according to use of a mobile terminal 100. The data area may store data recorded by the user during a video phone call, images collected by the camera 170 that the user wants to store, user data associated with various option functions provided from the mobile terminal 100, for example, moving images, phone-book data, audio data, and corresponding contents or information corresponding to the user data. The data area may temporarily store an additional video frame among images collected by the camera 170, and an additional video frame included in integral video phone call data provided from another mobile terminal The camera 170 collects images for a video phone call and an additional video frame for creating and integral video phone call data. The camera 170 includes a camera sensor (not shown) capturing an image photographed through a lens and for converting a photographed optical signal into an electric signal, and a signal processor (not shown) for converting a photographed analog image signal from the camera sensor into digital data. The camera sensor may be implemented by a Charge Coupled Device (CCD) sensor, and the signal processor may be implemented by a Digital Signal Processor (DSP). However, exemplary embodiments of the present invention are not limited thereto. The camera 170 transfers the collected images to the controller 160. The camera 170 may transfer the collected images to the display unit 140 in the form of preview.

The controller 160 may control signal transmission/reception for video phone call connection between the first mobile terminal 101 and the second mobile terminal 102. If a user of the first mobile terminal 101 creates an input signal for requesting video phone call connection, the controller 160 of the first mobile terminal 101 may activate the camera 170, and perform a control operation to create and transmit a video phone call connection request message including a phone number of the second mobile terminal 102 to the second mobile terminal 102. When the user of the second mobile terminal user 102 accepts video phone call connection, the respective controllers 160 of the first and second mobile terminals 101 and 102 may control transmission/reception of a signaling message and generation of integral video phone call data for transmission/reception of integral video phone call data, and transmission/reception of the generated integral video phone call data.

Figure 3:
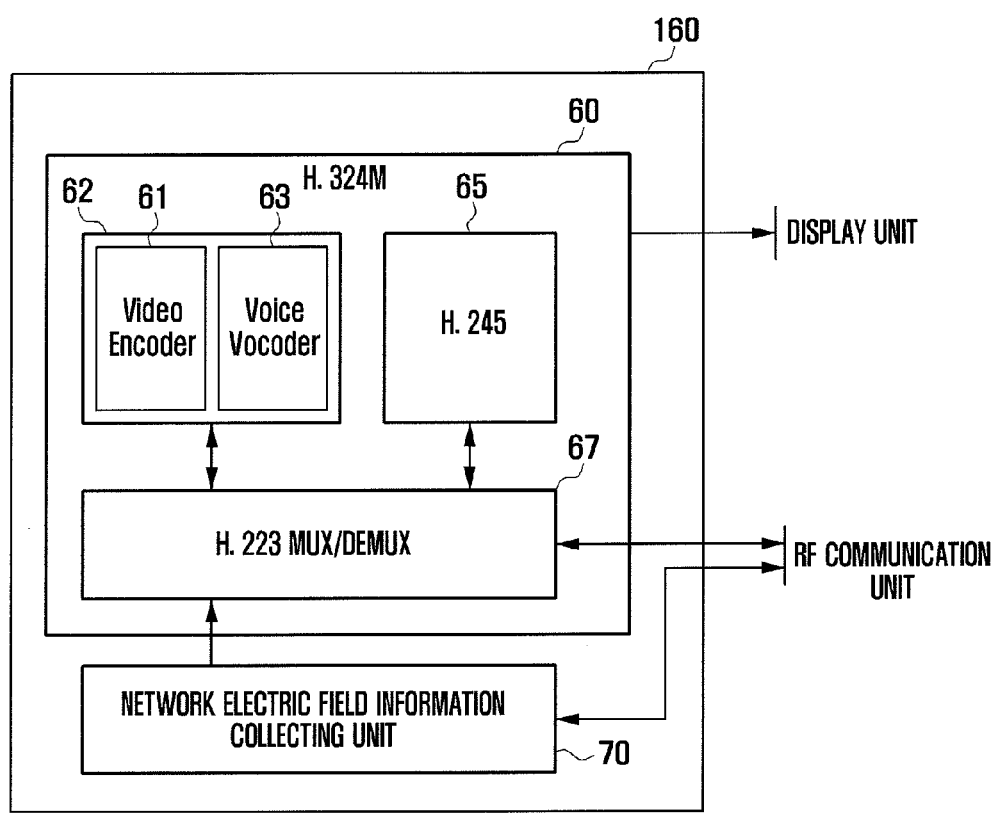
FIG. 3 is a block diagram illustrating a detailed configuration of a controller according to an exemplary embodiment of the present invention.

FIG. 3 is a block diagram illustrating a detailed configuration of a controller according to an exemplary embodiment of the present invention.

Referring to FIG. 3, the controller 160 includes an H.324M module 60 and a network electric field information collecting unit 70. The H.324M module 60 may include an H.223 module 67, a video/audio codec 62, and an H.245 module 65.

The controller 160 controls an overall video phone call operation of the mobile terminal 100, call connection and release through the RF communication unit 110, and transmission and reception of image and voice information through multiplexing and de-multiplexing with respect to image and voice information. The controller 160 performs a control operation to transmit additional data, namely, an additional video frame and network signal strength information using a stuffing data region to greatly improve image quality of a general video phone call through an existing 3G-324M protocol operation to improve video phone call quality through transfer of the additional video frame and the network electric field information and to use the additional video frame as Quality of Service (QoS) technology.

The network electric field information collecting unit 70 may collect signal strength information of a communication network using the RF communication unit 110. The network signal strength information collecting unit 70 may collect information on a wireless environment between a corresponding base station and a mobile terminal from base station information provided from a base station or electric field information of a communication network through a Received Signal Strength Indicator (RSSI) test of the mobile terminal 100. The network electric field information collecting unit 70 transfers the collected network signal strength information to the H.223 module 67.

The network electric field information collection unit 70 may perform a control operation to adjust a characteristic of an additional video frame created by the video/audio codec 62 according to an electric field situation. When electric field information according to a wireless environment of a communication network is equal to or greater than a predetermined value, for example, is a strong or middle electric field, the network electric field information collection unit 70 may perform a control operation to generate a P frame as an additional video frame. When the electric field information is less than the predetermined value, the network electric field information collection unit 70 may perform a control operation to create an I frame as the additional video frame. Accordingly, when the wireless environment is not excellent, respective mobile terminals may restore an image based on an additional video frame to provide enhanced resolution quality.

The H.245 module 65 may transmit and receive a control message to relay the performance and a channel between mobile terminals 100. The control message performs capability exchange, open and close of a logical channel, mode preference request, flow control, general command, and instruction. The control messages may be used to support Master/Slave Determination (MSD), capability exchange with respect to performance between both terminals, logic channel signaling, bilateral logic channel signaling, closed logic channel signaling mode request, and determination with delay thereof.

An H.245 module 65 performs a control command used for transmission/reception of integral video phone call data suggested by an exemplary embodiment of the present invention. When transmitting/receiving a signaling message, the H.245 module 65 may transfer messages used for setting transmission/reception of the integral video phone call data, for example, as illustrated in Table 1 to the H.223 module 67 to exchange the messages with another mobile terminal.

TABLE 1

MultimediaSystemControlMessage := CHOICE
{ Request RequestMessage,
Response ResponseMessage,
Command CommandMessage,
Indication IndicationMessage,
..
}
RequestMessage
RequestMessage :=CHOICE
{ onStandard xtraDataEnableRequest
MasterSlaveDetermination MasterSlaveDetermination,
..,
}
ResponseMessage
ResponseMessage :=CHOICE
{ onStandard xtraDataEnableAck
MasterSlaveDetermination MasterSlaveDetermination,
....,
}

The H.223 module 67 transfers signaling messages provided from the H.245 module 65 to the RF communication unit 110. The signaling messages may be transmitted to another terminal through a communication network to perform negotiation with respect to transmission/reception of the integral video phone call data.

The H.223 module 67 performs a control operation to integrate and transmit collected and converted audio data, image data, and control data to another mobile terminal. The H.223 module 67 demultiplexes transmitted data to audio data, image data, and control data. The H.223 module 67 may perform a control operation to add an additional video frame provided from the camera 170 to video phone call data for creating integral video phone call data, and to transmit the created integral video phone call data to another mobile terminal. The H.223 module 67 may extract the audio data, image data, control data, and additional video frame from the received integral video phone call data. The H.223 module 67 may transfer the extracted additional video frame to the video/audio codec 62 to apply the additional video frame to restoration of the image data.

The H.223 module 67 may perform a control operation to write the transferred network signal strength information and additional video frame in a conventional stuffing data region. When a packet to be transmitted to another mobile terminal is less than 64 Kbps by a predetermined value, namely, occurs in the stuffing data region, the H.223 module 67 may perform a control operation to write the additional video frame and network electric field information in the stuffing data region. The 64 Kbps is determined by a data transfer protocol of the communication network, and may be changed according to characteristics of the communication network.

When video phone call data containing the audio data, the image data, and the control data is similar to 64 kbps being a data transfer protocol of a communication network, the H.223 module 67 may perform a control operation to transmit only video phone call data without separate integration of an additional video frame. When a residual amount of a stuffing data region is the size capable of transmitting a P frame but less than the size capable of transmitting an I frame in this procedure, the H.223 module 67 controls the video/audio codec 62 to generate and transfer a P frame regardless of electric field information, and integrate a corresponding P frame image with the video phone call data and transmit the P frame as integral video phone call data. When the electric field information is excellent, the H.223 module 67 may perform a control operation to write a P frame created from the video/audio codec 62 in a corresponding packet and transmit the packet regardless of a residual amount of the stuffing data area under the control of the network electric field information collecting unit 70.

The video/audio codec 62 may include a video encoder 61 and a voice vocoder 63. The video encoder 61 converts an image signal collected by the camera 170 suited to a video phone call to generate image data. When controlling the H.223 module 67 and generating a Service Data Unit (SDU), the video encoder 61 may generate an additional video frame. The video encoder 61 may transfer the generated image data and additional video frame to the H.223 module 67. The voice vocoder 63 may convert an audio signal collected by the microphone MIC of the audio processor 130 into audio data capable of being transmitted in a video phone call environment, and transfer the converted audio data to the H.223 module 67. The video/audio codec 62 may decode audio data and video data demultiplexed from the H.223 module 67 based on control data and output the decoded audio data and video data to the speaker SPK of the audio processor 130 and the display unit 140. The H.233 module 67 transfers an additional video frame, and the video/audio codec 62 may perform a control operation to update image data using a corresponding additional video frame or substitute the additional video frame by a recent frame.

As illustrated previously, the mobile terminal 100 collects and transmits an additional video frame according to an electric field environment of a communication network while providing a video phone call service to output high quality images.

Figure 4:
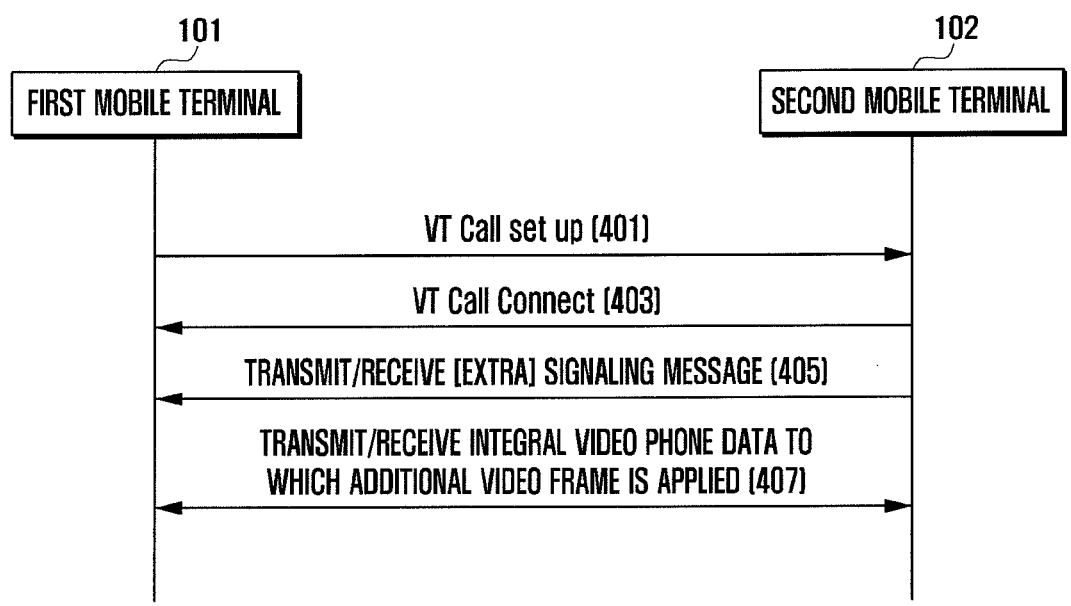
FIG. 4 is a diagram illustrating signal flow between constructions of a video phone call system according to an exemplary embodiment of the present invention.

FIG. 4 is a diagram illustrating signal flow between constructions of a video phone call system according to an exemplary embodiment of the present invention.

Referring to FIG. 4, the first mobile terminal 101 transmits an image call connection request message (VT Call Set up) to the second mobile terminal 102 according to user control in step 401. The user may create an input signal selecting a menu capable of activating a video phone call using an input unit or a display unit of a touch screen function provided from the first mobile terminal 101.

When the second mobile terminal 102 receives a video phone call connection request message (VT Call Set up), the second mobile terminal 102 may indicate to a corresponding user that a video phone call connection request is received. For example, the second mobile terminal 102 may perform a control operation to output an indication according to reception of the video phone call connection request from the first mobile terminal 101 using the display unit 140, the audio processor 130, and/or a vibration motor or a lamp. When the second mobile terminal 102 user accepts the video phone call connection request, the second mobile terminal 102 may perform a control operation to transmit a video phone call connect accept message (VT Call Connect) to the first mobile terminal 101 in step 403.

The first mobile terminal 101 and the second mobile terminal 102 may transmit and receive various signaling messages used for video phone call connection in step 405. The first mobile terminal 101 and the second mobile terminal 102 may transmit/receive a mobile level detection message determining data integrity test and error correction stage of a video phone call, and transmit/receive an MSD for determining a priority between a subject of a mutual operation and a terminal. The first mobile terminal 101 and the second mobile terminal 102 may transmit/receive a message for determining presence of an operation of a video phone call service based on integral video phone call data using an additional video frame. The first mobile terminal 101 and the second mobile terminal 102 may transmit/receive a Terminal Capability profile Set TCS message, transmit/receive a Multiple table Entry Set (MES) message for determining the size of transmitted data and packet information, and transmit/receive a message for an Open Logical Channel (OLC) for setting and opening a logic channel of a final image and voice. The TCS message may include capacity information of the image and voice codec. The OLC message may contain an audio relation OLC message, a video relation OLC message, an audio relation OLC ACKnowledgment (ACK) message, and a video relation OLC ACK message. If transmission/reception of a certain signaling message fails in the transmitting/receiving procedure of the signaling message, the video phone call connection procedure fails, and the first mobile terminal 101 and the second mobile terminal 102 may inform the user of the connection failure.

If the transmission/reception of a signaling message, in particular, transmission/reception of the signaling message with respect to a service operation based on the integral video phone call data succeeds, the first mobile terminal 101 and the second mobile terminal 102 may use a video phone call service in step 407 based on an integral video phone call data packet to which an additional video frame is applied as illustrated in Table 2.

TABLE 2

| Video | voice | control data | Extra Data |
|-------|-------|--------------|------------|

In Table 2, Extra Data may contain an additional video frame and signal strength information of a communication network.

Figure 5:
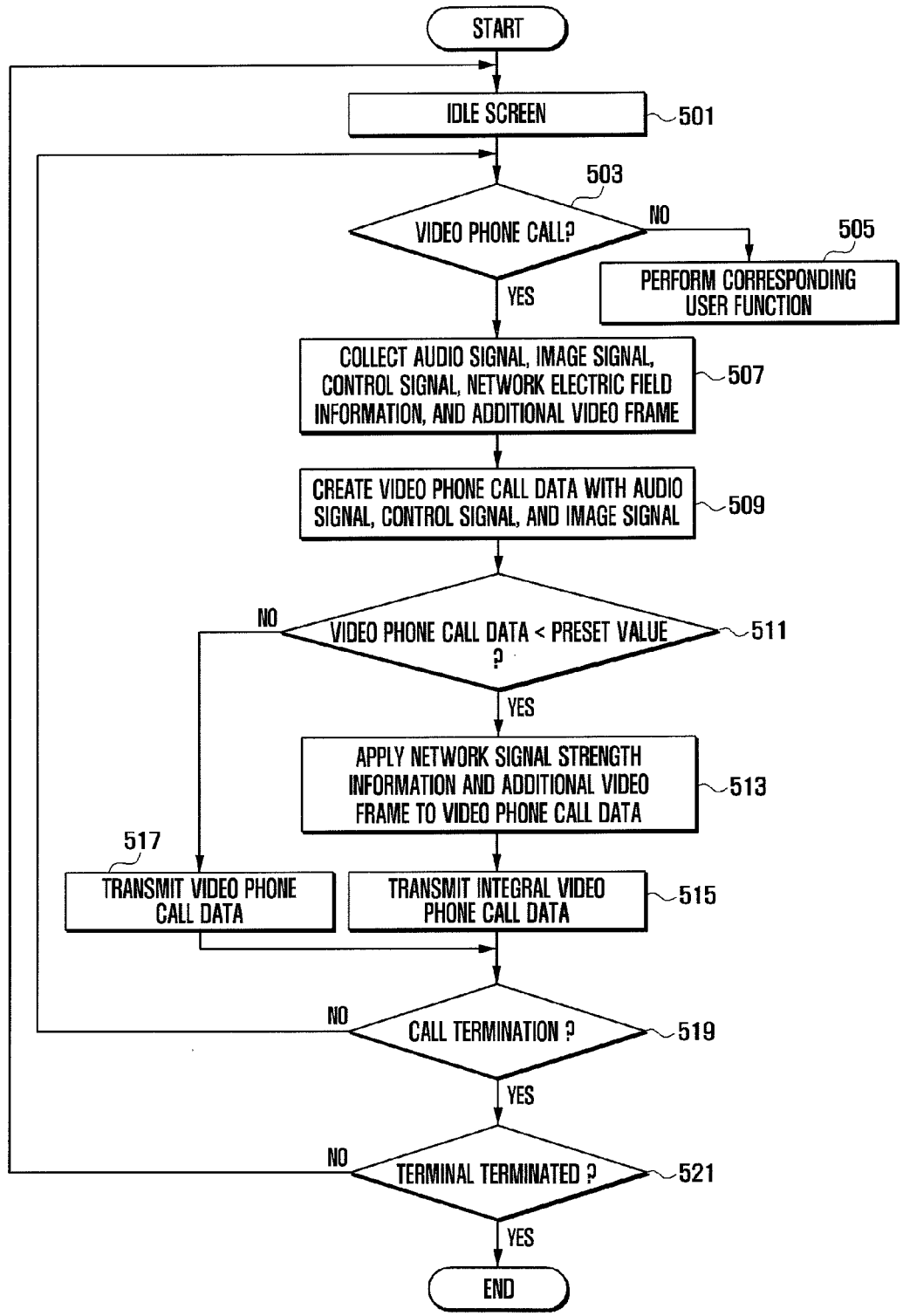
FIG. 5 is a flowchart illustrating an operation method of a mobile terminal of a transmission side in a video phone call according to an exemplary embodiment of the present invention.

FIG. 5 is a flowchart illustrating an operation method of a mobile terminal of a transmission side during a video phone call method of according to an exemplary embodiment of the present invention.

Referring to FIG. 5, when power is supplied to the mobile terminal 100, the controller 160 of the mobile terminal 100 initializes components of the mobile terminal 100 with the supplied power. If the initializing procedure is terminated, the controller 160 performs a control operation to output an idle screen according to preset schedule information in step 501.

When an input signal occurs, the controller 160 determines whether the input signal is a signal for activating a video phone call in step 503. When the input signal is not the signal for activating a video phone call, the controller 160 may activate a user function of the mobile terminal 100, for example, a file playback function, a file search function, a web access function, a camera function, and a broadcasting receiving function according to the input signal in step 505.

When the input signal is the signal for activating a video phone call, the controller 160 transmits a video phone call connection request message to the second mobile terminal 102. When the controller 160 receives a video phone call connection accept message from the second mobile terminal 102, the controller 160 may perform a control operation to transmit/receive a signaling message for a video phone call service. The controller 160 may perform a control operation to transmit/receive a signaling message to become a video phone call service based on integral video phone call data according to an exemplary embodiment of the present invention. The controller 160 may exchange a message setting a video phone call operation based on the integral video phone call data with the second mobile terminal 102 in a transmission/reception procedure of the signaling message to set a corresponding function.

The controller 160 performs a control operation to collect an audio signal, an image signal, a control signal, and network electric field information, and an additional video frame for generating the integral video phone call data according thereto in step (507. The controller 160 may control characteristics of the additional video frame, for example, collection of an I frame or a P frame according to network electric field information.

If the foregoing information is collected, the controller 160 performs a control operation to create video phone call data with an audio signal, a control signal, and an image signal in step 509. The controller 160 may create video phone call data according to a data transfer protocol set according to characteristics of a communication network and characteristics of the second mobile terminal 102 during the transmission/reception procedure of a signaling message.

The controller 160 determines whether the created video phone call data are less than a preset value in step 511. The controller 160 may determine whether a stuffing data region of the created video phone call data occurs in a predetermined region. When the stuffing data region occurs in the predetermined region in step 511, the controller 160 applies the network signal strength information and the additional video frame to the stuffing data region of the video phone call data to create integral video phone call data in step 513. The controller 160 performs a control operation to transmit the integral video phone call data to the second mobile terminal 102 in step 515.

When the video phone call data are equal to or greater than the preset value, that is, the video phone call data have a packet size greater than a predetermined amount in comparison with a data transfer protocol, for example, 64 Kbps, the controller 160 performs a control operation to transmit video phone call data to the second mobile terminal 102 in step 517.

The controller 160 determines whether an input signal for terminating a video phone call occurs in step 519. When the input signal for terminating a video phone call does not occur, the process returns to step 503. When the input signal for terminating a video phone call occurs in step 519, the controller 160 terminates the terminal or returns to step 501 according to whether the input signal for terminating a video phone call occurs in step 521.

As illustrated previously, a video phone call method according to an exemplary embodiment of the present invention creates and transmits/receives an additional video frame according to a network environment to transmit and output an image of excellent quality and efficiently operate a resource of a network.

Figure 6:
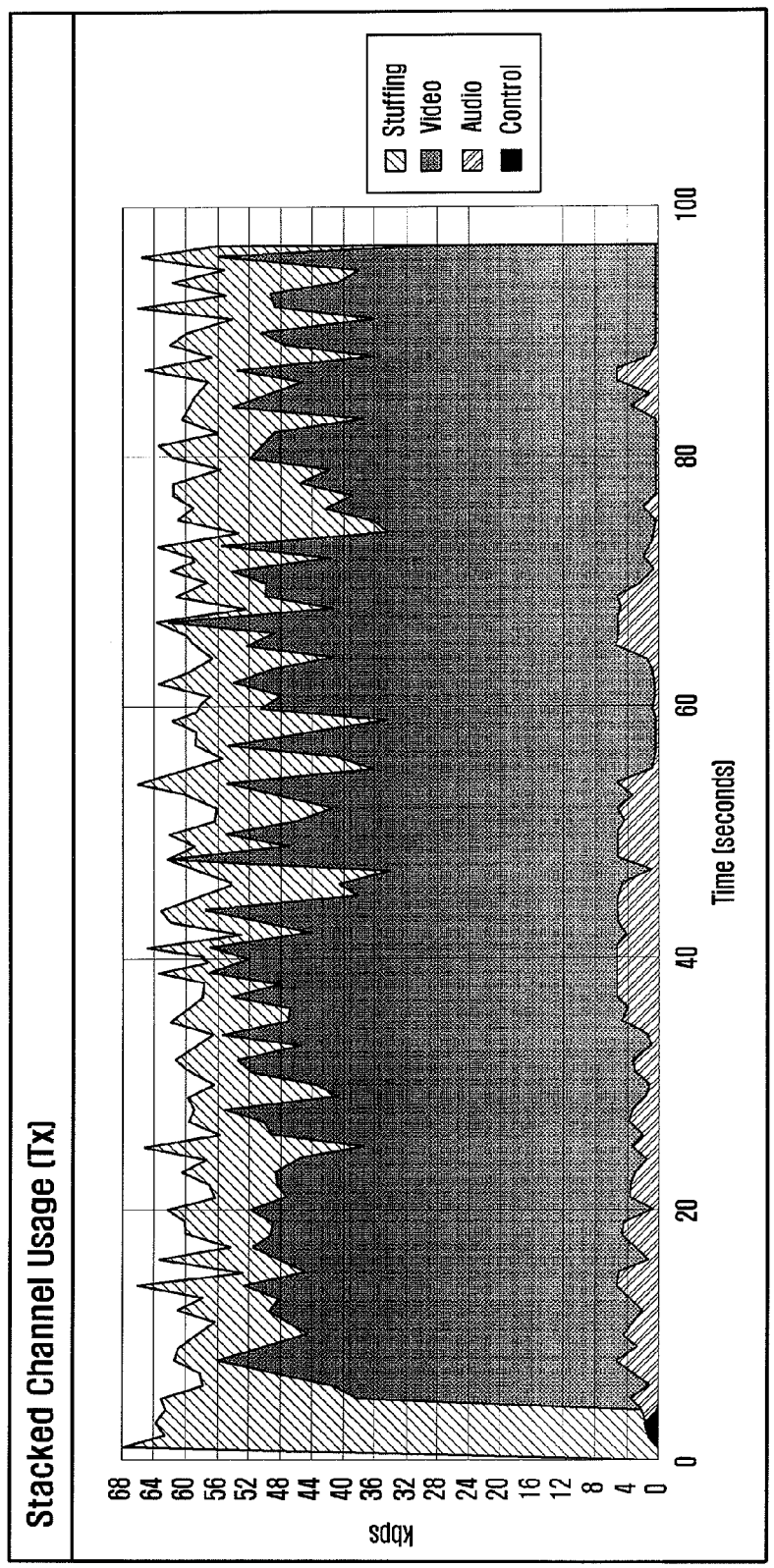
FIG. 6 is a graph illustrating a used rate of a data channel according to a video phone call method according to the related art.
Figure 8:
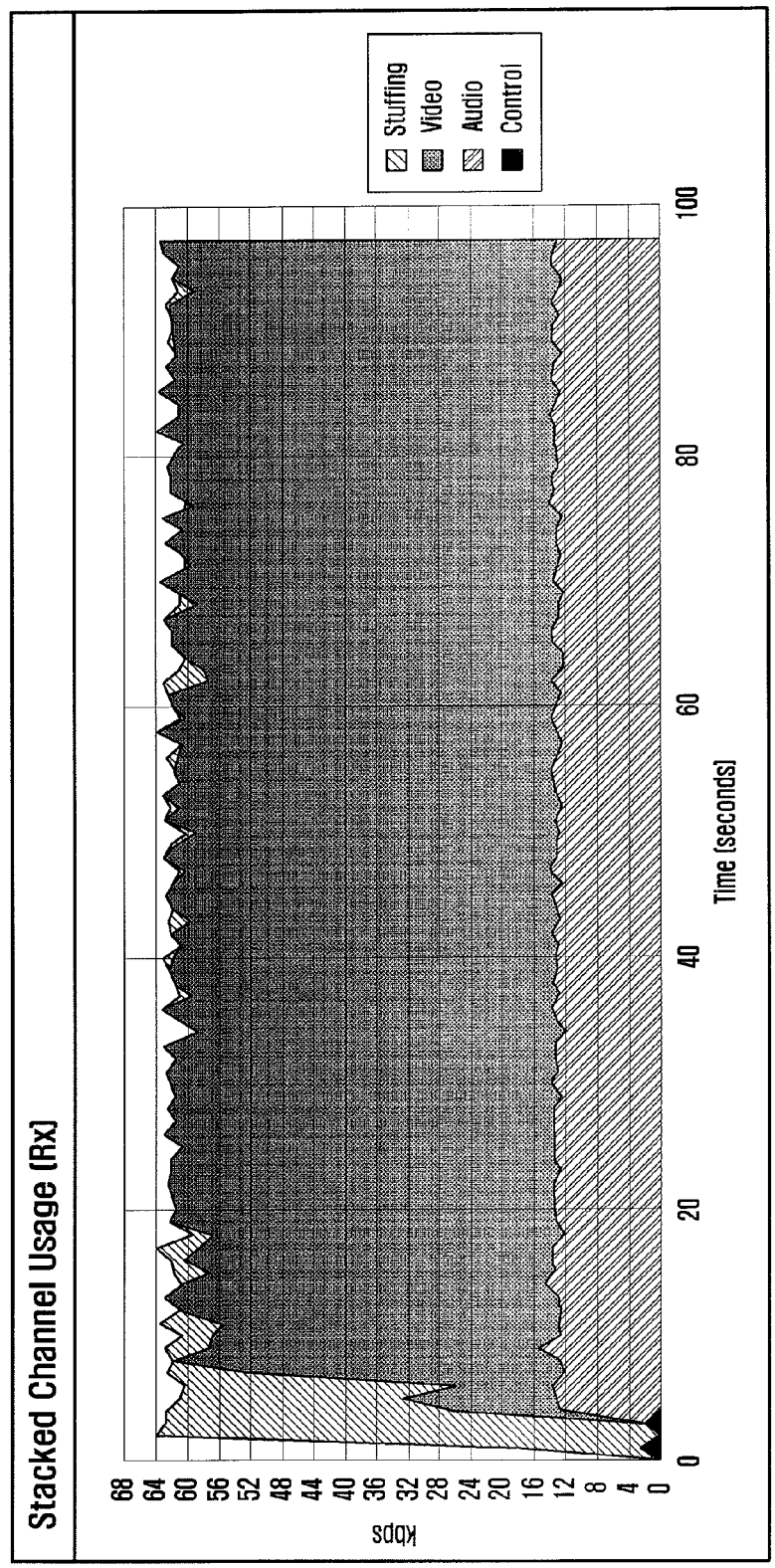
FIG. 8 is a graph illustrating a used rate of a data channel according to a video phone call method according to an exemplary embodiment of the present invention.

FIGS. 6 and 7 are graphs illustrating a used rate of a data channel according to a video phone call method where a data transfer protocol is 64 kbps according to the related art. FIGS. 8 and 9 are views illustrating a used rate of a data channel according to a video phone call method based on integral video phone call data according to an exemplary embodiment of the present invention.

Referring to FIGS. 6 to 9, a video phone call method according to an exemplary embodiment of the present invention has a higher video transmission rate in comparison with a method according to the related art. Comparing the video call according to the related art shown in FIGS. 6 and 7 with the video phone call according to an exemplary embodiment of the present invention shown in FIGS. 8 and 9, it is apparent that the video phone call method according to an exemplary embodiment of the present invention may transmit images of higher quality, and accordingly output images of higher quality.

As illustrated previously, a video phone call method and apparatus according to an exemplary embodiment of the present invention may output images of higher quality. Because a video phone call method and apparatus according to an exemplary embodiment of the present invention do not use stuffing data, and instead uses Extra data with respect to a video phone call technology of the related art having a limitation of each channel of a fixed bandwidth instead of stuffing data to improve call quality. Exemplary embodiments of the present invention may rapidly update video and substitute the updated video with a new frame through use of an additional video frame instead of stuffing data to secure video quality.

As described above, a mobile terminal of the transmission side has been referred to as the first mobile terminal, and a mobile terminal of the reception side has been referred to as the second mobile terminal. However, a mobile terminal according to an exemplary embodiment of the present invention may be capable of performing functions of both the transmission and reception sides.

As illustrated previously, a video phone call method having a function of adjusting resolution quality and a video phone call apparatus supporting the same according to an exemplary embodiment of the present invention may support higher image quality during a video phone call by writing additional data and network state information in a stuffing data region and transmitting and receiving the stuffing data region.

Further, exemplary embodiments of the present invention transfer network state information and an additional video frame to a stuffing data region to improve a channel use rate according to reuse of a corresponding channel region, thereby supporting the efficient use of a network resource.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A video phone call method having a function of adjusting resolution quality, the method comprising:
   collecting an image signal, an audio signal, and a control signal for a video phone call;
   generating video phone call data including the collected image signal, audio signal, and control signal;
   adding a collected video frame to the video phone call data to generate integral video phone call data having an additional video frame when the video phone call data has a packet size less than a preset value according to a data transfer protocol;
   collecting network electric field information for a video phone call based on the integral video phone call data, wherein the generating of the integral video phone call data comprises writing the additional video frame and the network electric field information in a stuffing data region when a packet size of the video phone call data is less than the data transfer protocol by a predetermined value; and transmitting the integral video phone call data to another terminal.

2. The method of claim 1, further comprising transmitting/receiving a signaling message for setting a video phone call service based on the integral video phone call data when a signaling message according to connection of the video phone call is transmitted/received.

3. The method of claim 1, further comprising controlling a characteristic of the additional video frame according to network electric field information when the additional video frame is collected.

4. The method of claim 3, wherein the controlling of the characteristic of the additional video frame comprises:

collecting an image signal in the form of a P frame as the additional video frame when the network signal strength information is equal to or greater than a predetermined value; and collecting an image signal in the form of an I frame as the additional video frame when the network electric field information is less than the predetermined value.

5. The method of claim 1, wherein the generating of the video phone call data comprises controlling respective sizes of the audio signal, the image signal, and the control signal to be less than a predetermined size according to a data transfer protocol determined according to the other terminal and a communication network.

6. The method of claim 1, further comprising:

extracting the additional video frame from the integral video phone call data when the integral video phone call data are received; and applying the extracted additional video frame to an image signal included in the integral video phone call data and outputting the image signal.

7. A video phone call apparatus for adjusting resolution quality, the apparatus comprising:

a Radio Frequency (RF) communication unit configured to transmit a video phone call connection request message and to receive a video phone call connection accept message in response to the video phone call connection request message so as to form a communication channel for connection of video phone call;

a camera configured to collect an image signal for the video phone call;

an audio processor configured to collect an audio signal for the video phone call; and a controller configured to create a control signal for controlling the image signal and the audio signal, to create video phone call data including the image signal, the audio signal, and the control signal, and to add a collected video frame to the video phone call data to generate integral video phone call data having an additional video frame when the video phone call data has a packet size less than a preset value according to a data transfer protocol, wherein the controller comprises a network electric field information collecting unit configured to collect network electric field information of a communication network for the video phone call, and to add the additional video frame and the network electric field information in a stuffing data region when a packet size of the video phone call data is less than the data transfer protocol determined for the video phone call by a predetermined value.

8. The apparatus of claim 7, wherein the controller comprises:

an H.223 module for performing a control operation to transmit/receive a signal message for setting a video phone call service based on the integral video phone data when a signal message according to the connection of the video phone call is transmitted/received;

an H.245 for creating the control signal; and a video/audio codec for processing the image signal and the audio signal.

9. The apparatus of claim 8, wherein the network electric field information collecting unit controls a characteristic of the additional video frame according to network electric field information when the additional video frame is collected.

10. The apparatus of claim 9, wherein the network electric field information collecting unit performs a control operation to collect an image signal in the form of a P frame as the additional video frame when the network electric field information is equal to or greater than a predetermined value, and collects an image signal in the form of an I frame as the additional video frame when the network electric field information is less than the predetermined value.

11. The apparatus of claim 10, wherein the video/audio codec creates an additional video frame corresponding to the P frame or the I frame for the H.223 module under control of the network signal strength information collecting unit, and transfers the additional video frame to the H.223 module.

12. The apparatus of claim 8, wherein the H.223module involves only network electric field information and an additional video frame in the form of a P frame in a stuffing data region allotted according to the size of a video phone call data packet in a data transfer protocol determined for the video phone call according to the size of a video phone call data packet.

13. The apparatus of claim 8, wherein the H.223 module performs a control operation to extract the additional video frame from the integral video phone call data when the integral video phone call data are received, and applies the extracted additional video frame to an image signal included in the integral video phone call data.

14. The apparatus of claim 13, further comprising outputting an image signal to which the extracted additional video frame is applied.

15. A terminal, comprising:

a communication unit configured to communicate video phone call data with another terminal;

a camera configured to collect an image signal for the video phone call;

a microphone and audio processor configured to collect an audio signal for the video phone call;

a display unit configured to display information related to the video phone call;

a speaker configured to reproduce an audio portion of the video phone call; and a controller configured to create a control signal to control the image signal and the audio signal, to create the video phone call data including the image signal, the audio signal, and the control signal, and to add an additional video frame to the video phone call to generate integral video phone call data having the additional video frame when the video phone call data has a packet size less than a preset value according to a data transfer protocol, wherein the controller comprises a network electric field information collecting unit configured to collect network electric field information of a communication network for the video phone call, and to add the additional video frame and the network electric field information in a stuffing data region when a packet size of the video phone call data is less than the data transfer protocol determined for the video phone call by a predetermined value.

* * * * *